United States Patent Office

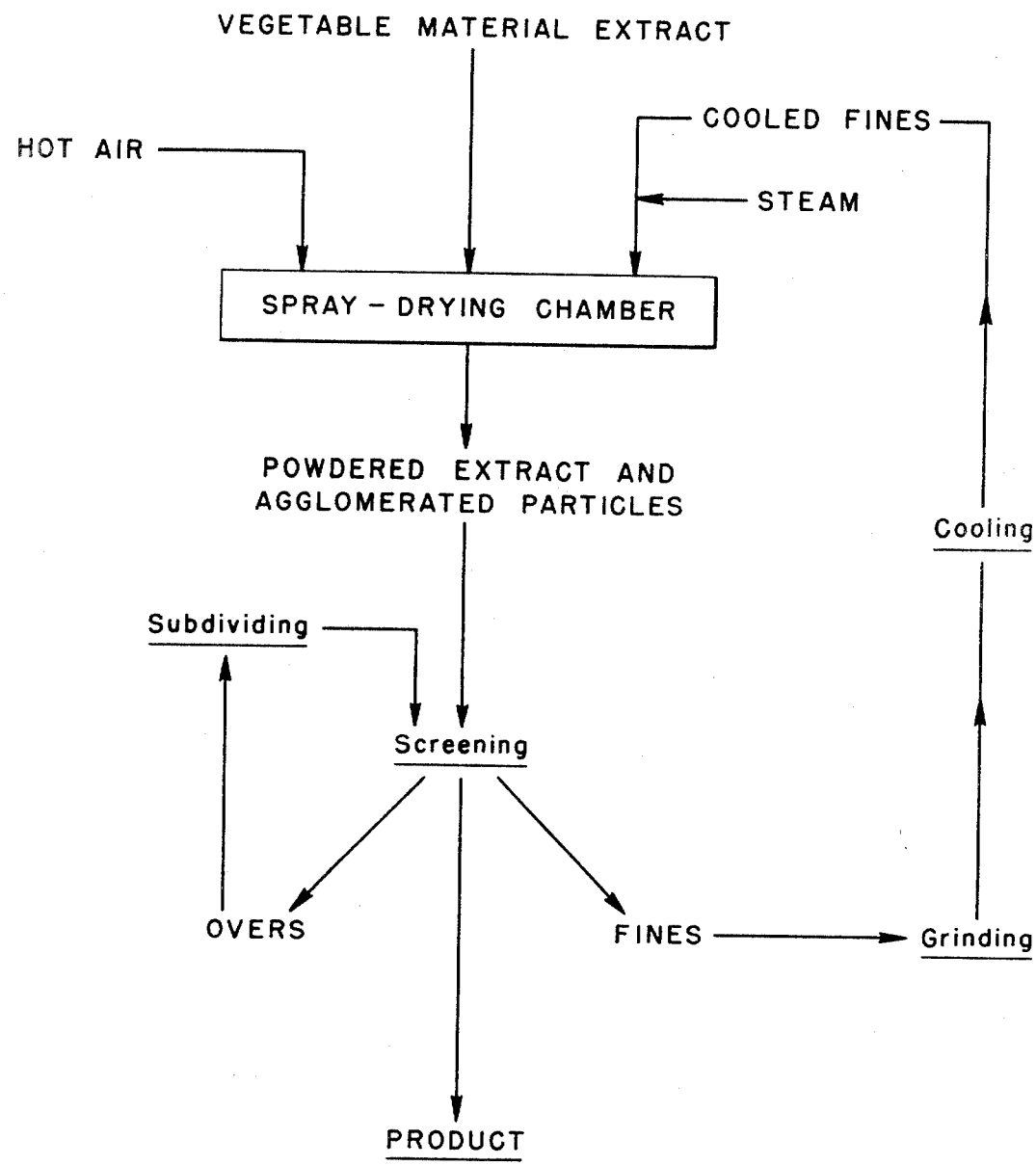

3,514,300
Patented May 26, 1970

3,514,300
DRYING PROCESS
Abraham Rudolf Mishkin and William Cornelius Marsh, Marysville, Ohio, assignors to Afico S.A., Lausane, Switzerland, a corporation of Switzerland
Continuation-in-part of application Ser. No. 643,823, June 6, 1967. This application May 15, 1968, Ser. No. 729,366
Int. Cl. B01d 1/18
U.S. Cl. 99—199
16 Claims

ABSTRACT OF THE DISCLOSURE

A method for simultaneously drying and agglomerating coffee or tea extracts is provided. The aqueous extract is spray dried, fine particles are separated by screening and are recycled into the spray-drier through agglomeration nozzles supplied with steam. The resulting powdered extracts are in the form of large, coarse-textured agglomerates.

---

This application is a continuation-in-part of application Ser. No. 643,823 filed June 6, 1967.

The present invention is concerned with a process for the production of powdered extracts from vegetable materials, notably from tea and coffee.

In general, powdered extracts are prepared from vegetable materials by extracting the material with water and subsequently removing the water from the aqueous extract, for example by spray-, roller- or freeze-drying. Not infrequently, however, the physical properties of the resulting extracts, and notably their colour, texture and particle size, are considered to be unsatisfactory, in that their colour is too light and the powder particles are undesirably small.

It is an object of the present invention to provide a method of producing powdered extracts from vegetable materials which are dark in colour, have a coarse texture and are free-flowing.

The present invention provides a process for the production of powdered extracts from vegetable materials such as tea and coffee which comprises the steps of spray-drying an aqueous extract of said material by injecting said aqueous extract and a current of a hot gas such as air, into a drying chamber, screening the resulting powdered extract and collecting at least one coarse particle fraction and a fine particle fraction, and feeding the fine particles into the drying chamber in at least one current of steam or a steam-containing gas thereby to agglomerate said fine particles.

A preferred process according to the invention is illustrated schematically in the accompanying drawing. The extract obtained initially from the extraction of vegetable material is introduced into a spray-drying chamber of conventional type together with hot air for the drying operation. When the operation becomes substantially continuous, cooled fines, separated from the desired product, are introduced with steam into the spray-drying zone.

The introduction of the fines with steam causes agglomeration of the fines, and the agglomerated particles together with the dry powdered extract are removed from the spray-drying zone. The powdered extract and agglomerated particles are submitted to a screening step utilizing one or more screens which are designed to separate product of predetermined size from smaller and larger particles.

The smaller particles or fines may then be forwarded to a comminution or grinding zone, and then preferably cooled before being recycled to the spray-drying zone with steam for agglomerating. Any undesirably larger particles or overs are reduced in size and recycled to the screening zone. The particles of desired size are removed from the screen as final product.

One particular advantage of the process is that it may be carried out continuously, the yield of agglomerated product being chosen in relation to the desired particle size. The spray-drying chamber is a conventional drier of the type where the spray liquor and hot air are injected at or near the top and the product leaves the chamber through an opening at the bottom. The lower portion of the chamber is usually conical in shape, the apex of the cone being at the lower end.

In carrying out the process, it is especially desirable to feed the fine particles into the drying chamber through one or more nozzles disposed around the hot air inlet in such a way that the particle streams intersect in the path of the hot air. Experiments have shown that a highly satisfactory agglomeration giving a dark-coloured, coarse-textured product may be achieved by using only one nozzle. The number of nozzles used will, in general, depend on the quantity of fine powder which is recirculated which, in turn, is proportionate to the final particle size desired. The steam may be injected into the nozzles either laterally or centrally, at pressures which are preferably within the range 0.15 to 1.1 kg./cm.$^2$. Of course, the steam pressure should be sufficiently high to expel the fine particles in a more or less straight stream. As stated above, the steam may if desired be mixed with another gas such as air, nitrogen or carbon dioxide. It is furthermore preferred to desuperheat the steam before it comes into contact with the fine powder particles.

The spray-drying conditions are those normally employed in the art. Thus, the hot air may be injected at a temperature in the range of 280 to 450° C., for example at around 350° C., the lower temperatures, in the neighbourhood of 300° C., being preferred for tea. The aqueous extract, which is preferably concentrated to 35–60% by weight, for example about 40–50% by weight, of soluble tea or coffee solids, may be injected at a pressure which may vary between 2 and 5 kg./cm.$^2$ and is desirably about 2.2 to 2.5 kg./cm.$^2$. Under these conditions the hot air leaves the chamber at a temperature of approximately 120° C. It is also possible to use a high pressure spray, for example at 28–140 kg./cm.$^2$. Such high pressures are preferred for tea, in order to secure a bulk density of around 80 gm./l. for the dry product.

As indicated previously, the powdered extract obtained from the spray-drier is screened and two fractions are collected, one coarse and one fine. It has been found particularly advantageous to effect the screening immediately the powder leaves the drier, that is, when it is still hot since, surprisingly, the hot powder has a diminished tendency to break down on the screens and hence a greater proportion of coarse particles may be recovered. In general, the temperature of the powder leaving the drier is between 65 and 110° C. and it is recommended, as far as possible, to screen at this temperature. The sizes of the screens will be chosen in relation to the desired overall particle size. Generally speaking, particles passing through a 20 mesh U.S. Standard Screen are normally recycled for agglomeration, but it is possible to recycle only those passing through a 30 or even a 40 screen. When the finer screens are used, the quantity of fines is smaller and 1 agglomeration nozzle is sufficient. It has been found that agglomeration is further improved if the fine particles are ground before being recycled to the drying chamber. In general, it is preferable that the recycled particles have a density of at least 400 gm./litre, as for example 600 to 700 gm./l.

For uniformity of product, it is desirable to reduce the very large particles and it is therefore advantageous first to pass the powder leaving the drier through a coarse screen, such as a 4, 6 or 8 mesh, thereby to size these coarse agglomerate structures. The coarse particles (overs) may be subdivided to the desired size, for example by pressing through the screen.

The particles passing through the fine (20, 30 or 40 mesh) screen are preferably cooled before being fed into the spray-drying chamber, and this may conveniently be effected whilst they are being conveyed to the top of the spray-drying chamber. The powder may be conveyed by any desired means, such as for example a pneumatic conveyor or bucket elevator. For cooling the powder, it is advantageous to inject a cooled gas such as air, nitrogen, etc., into the conduit through which the powder is conveyed. Alternatively, liquid carbon dioxide may also be used for this purpose. Preferably, the powder is cooled to below 40° C., and more desirably about 30° C. or lower. It should be noted that the lower is the temperature of the powder the more steam will condense on the particles. Thus it is also advantageous to desuperheat the steam prior to contact with the cooled particles.

Spray-driers are provided generally with at least one cyclone separator which removes the very fine particles from the drying chamber. These particles are then continuously fed back to the chamber near the spray liquor injection nozzle where they stick more or less well to the freshly atomized particles. In practising the method of the present invention, however, the very fine particles removed by the cyclone separators may be combined with the fines obtained by screening and optionally after grinding to a density of at least 400 gm./litre, be fed back to the chamber through the agglomeration nozzles. A much more efficient agglomeration may thus be obtained.

When the process according to the present invention is applied to coffee extract, the resulting product is dark in colour, free-flowing and has a coarse texture resembling that of roasted and ground coffee. Likewise, the powdered tea extract obtained by the process described herein has a very attractive colour and is free-flowing. The particles have the form of large coarse agglomerates.

The following examples are given only for the purpose of illustrating the invention.

EXAMPLE 1

A coffee extract was prepared by aqueous extraction of ground roasted coffee in a series of percolators and concentrated to 52.19% solids. The extract was fed at the rate of 860 kg./hour to the nozzle of spray-drier and sprayed downwardly at a pressure of 4.25 kg./cm.$^2$ cocurrent to air at 345° C.

Initial dried coffee powder from the bottom of the drier cone contained 3% moisture and left at 293 kg./hour. The powder immediately fell into a sifter with two screens, a 4 mesh U.S. Standard Screen on top and a 20 mesh U.S. Standard Screen at the bottom, thus dividing the product into 3 streams, i.e. "over," greater than 4 mesh, "product," from 4 to 20 mesh and "sifter fines," under 20 mesh.

The product stream was cooled and collected for packaging while the fine stream was conveyed to a pneumatic conveyor hopper where it was mixed with 164 kg./hour cyclone collector fines which contained 1.0% moisture. Cold air introduced by the pneumatic conveyor cooled the mixture from 70° C. to 32° C. as it was elevated to the top of the drier. The mixture was caught in a small cyclone collector and immediately passed back into the drier through two agglomerating nozzles supplied with steam of 0.7 kg./cm.$^2$ pressure.

As operation continued, the rates of product, sifter fines and collector fines increased until steady state was reached. At steady state the following rates were observed: product—456 kg./hour at 3% moisture, sifter fines—967 kg./hour at 3% moisture, collector fines—290 kg./hour at 1% moisture, and overs—12 kg./hour. The overs stream was recycled to a drier feed tank where it was reconstituted into the drier spray mix.

The product was conveyed to filling machines where the average filling rate was 452 kg./hour of attractive large dark particles containing 3.0% moisture.

EXAMPLE 2

Ground roasted coffee was extracted so that 1903 kg./hour of extract at 25% solids were produced. The extract was stripped, evaporated and the distillate was returned so that 1076 kg./hour of spray mix at 44% solids was pumped at 3.5 kg./cm.$^2$ pressure to the spray-drier nozzle.

The overs, product and sifter fines were separated by means of two screens on the sifter under the drier, a 10 mesh U.S. Standard Screen on top and a 30 mesh U.S. Standard Screen on the bottom. The sifter fines were reinjected into the spray-drier through an agglomeration nozzle fed with steam. When steady state was reached, the following rates were observed: product from the filling machines—479 kg./hour at 3.1% moisture, sifter fines—457 kg./hour at 3.1% moisture, cyclone collector fines—279 kg./hour at 0.8% moisture, overs—15.5 kg./hour at 3.1% moisture.

The filled product was in the form of large uniform dark particles having a packed density of about 27 grams/100 cc.

EXAMPLE 3

A spray mix containing 57% coffee solids was dried in a spray-drier at a rate of 998 kg./hour. Powder from the drier outlet was sifted hot on a sifter containing two screens, the top one a 6 mesh U.S. Standard Screen and the bottom one a 25 mesh U.S. Standard Screen. Sifter fines and cyclone collector fines were brought together at the inlet to a bucket elevator and conveyed to the top of the drier into the agglomeration nozzles operated at 0.35 kg./cm.$^2$ steam pressure.

As the run progressed, the fines rate increased until steady state was reached. At steady state the various rates were as follows: product from the drier—564 kg./hour of coffee solids, sifter fines—726 kg./hour, collector fines—395 kg./hour, overs—25 kg./hour.

The drier product was filled in glass jars. The final product after filling was in the form of uniform large, dark brown particles with a packed density of 27 grams/100 cc.

EXAMPLE 4

Tea leaves were extracted in percolators by water at 100° C., so that 19,000 kg./hour of tea liquor containing 2.15% soluble solids were produced. The tea liquor was stripped countercurrent to steam in a bubble cap column from which 386 kg./hour of distillate and 20,400 kg./hour of liquor at 2.00% solids were obtained. The liquor was evaporated to 62.0% solids and the distillate was added back continuously, giving a spray-mix of 39.10 solids at 1044 kg./hour. The concentrated liquor was then pumped to the drier nozzle at a pressure of 105 kg./cm.$^2$, where it was sprayed into a hot air stream at 290° C. as a fine mist. The specific volume of the final powder was controlled by adding $CO_2$ to the extract. Dried powder from the spray-drier was directed to a sifter containing two screens: an 8 mesh U.S. Standard Screen on top, and a 30 mesh U.S. Standard Screen on the bottom. After steady state was reached, 406 kg./hour of 8–30 mesh material was retained as product and 545 kg./hour of finer material was blended with 286 kg./hour of collector fines and recycled to the top of the drier, where the mixture passed back into the chamber through an agglomerating nozzle operated with 1.05 kg./cm.$^2$ steam. The product consisted of an attractive, light coloured instant tea, with a packed density of about 10 grams/100 cc.

EXAMPLE 5

A spray mix containing 50% coffee solids was dried in a spray-drying chamber at a rate of 1000 kg./hour. Powder from the chamber outlet was sifted hot (85° C.) on a sifter having two screens, a 5 mesh U.S. Standard Screen on top and a 20 mesh on the bottom. The particles remaining on the upper screen were pressed through the openings, thereby eliminating an "overs" stream.

Sifter fines and cyclone collector powder were combined and ground to a bulk density of 650 gm./litre. Thereafter the ground material was cooled to 30° C. and conveyed to the top of the drier where it was injected into the chamber through one agglomeration nozzle operating at 0.15 kg./cm.² steam pressure. The steam supplied to the nozzle was first desuperheated by adding a small quantity of water.

Under steady state conditions, the following rates were observed: product from drier (+20 mesh)—500 kg./hour, sifter fines—600 kg./hour and collector fines—150 kg./hour.

The drier product was in the form of uniform, large, dark brown particles, resembling roasted and ground coffee, and having a density of 220 gm./litre.

We claim:

1. A process for the production of powders from liquid extracts of vegetable food materials which comprises the steps of spray-drying an aqueous extract of said material by injecting said aqueous extract and a current of hot air into a drying chamber, screening the resulting powdered extract and collecting at least one coarse particle fraction and a fine particle fraction, and feeding the fine particle fraction at a temperature lower than the collecting temperature into the the drying chamber in at least one current of steam or steam-containing gas thereby to agglomerate said fine particles.

2. A process according to claim 1 in which the powdered extract is first screened on a 6 mesh screen and the overs are subdivided to pass through said screen.

3. A process according to claim 1 in which the vegetable food material is coffee.

4. A process according to claim 3 in which the powdered extract is screened whilst it is at a temperature of 65 to 110° C.

5. A process according to claim 1 in which the fine particles are fed into the drying chamber in proximity to the hot air current.

6. A process according to claim 5 in which the vegetable food material is coffee and the fine particles, obtained by screening on a 30 mesh screen, are cooled to below about 40° C.

7. A process according to claim 6 in which the aqueous extract is injected into the drying chamber in parallel current with the hot air.

8. A process according to claim 7 in which the hot air is at a temperature of about 350° C.

9. A process according to claim 1 in which the vegetable food material is tea and the aqueous extract is injected into the spray-drying chamber at a pressure between 28 and 140 kg./cm.².

10. A process according to claim 9 in which the aqueous extract contains about 40% tea solids.

11. A process for the production of a powdered coffee extract which comprises spray-drying an aqueous coffee extract containing 35 to 60% by weight of soluble coffee solids by injecting said extract into a spray-drying chamber at a pressure of 2 to 5 kg./cm.² and in parallel with a current of hot air, screening the resulting powdered extract at the temperature at which it leaves the spray-drying chamber and collecting a coarse particle fraction which remains on a 20 mesh U.S. Standard Screen and a fine particle fraction which passes through said screen and feeding said fine particles into the spray-drying chamber in proximity to the hot air current, said fine particles being fed in a jet of steam through at least one nozzle, said jet being so disposed that its path intersects the hot air stream.

12. A process according to claim 11 in which the fine particles are cooled to about 30° C. before being fed into the spray-drying chamber.

13. A process according to claim 11 in which the hot air is at a temperature of about 350° C.

14. A process for the production of a powdered tea extract which comprises spray-drying an aqueous tea extract containing about 40% by weight of soluble tea solids by injecting said extract into a spray-drying chamber at a pressure of 28 to 140 kg./cm.² and in parallel with a current of hot air, screening the resulting powdered extract at the temperature at which it leaves the spray-drying chamber and collecing a coarse particle fraction which remains on a 30 mesh U.S. Standard Screen and a fine particle fraction which passes through said screen, and feeding said fine particles into the spray-drying chamber in proximity to the hot air current, said fine particles being fed in a jet of steam through at least one nozzle, said jet being so disposed that its path inersects the hot air stream.

15. A process according to claim 14 in which the hot air is at a temperature of about 290° C.

16. A process according to claim 14 in which the fine particles are cooled to about 30° C. before being fed into the spray-drying chamber.

References Cited

UNITED STATES PATENTS

| | | | |
|---|---|---|---|
| 1,157,935 | 10/1915 | Gray | 99—199 |
| 2,856,290 | 10/1958 | Peebles | 99—199 |
| 3,244,533 | 4/1966 | Clinton | 99—199 X |
| 3,261,689 | 7/1966 | Ponzoni | 99—199 X |
| 3,262,213 | 7/1966 | Austin et al. | 34—10 |
| 3,313,629 | 4/1967 | Thompson et al. | 99—199 X |
| 3,345,182 | 10/1967 | Huste | 99—199 X |
| 2,892,689 | 6/1959 | Rushford | 23—314 |
| 2,979,421 | 4/1961 | Rissman et al. | 23—313 |

NORMAN YUDKOFF, Primary Examiner

J. SOFER, Assistant Examiner

U.S. Cl. X.R.

99—204; 159—48